Patented Oct. 13, 1942

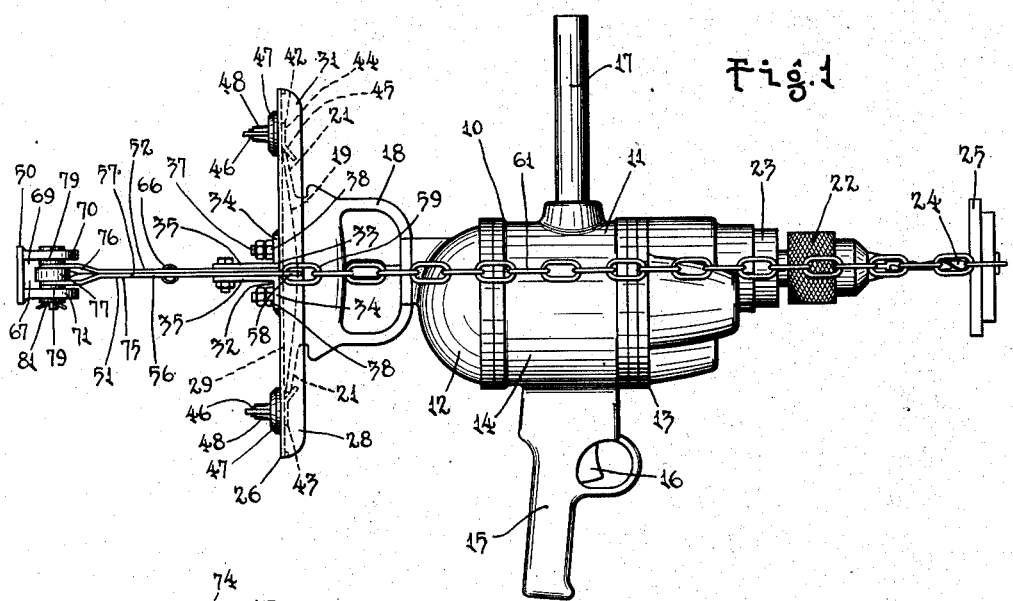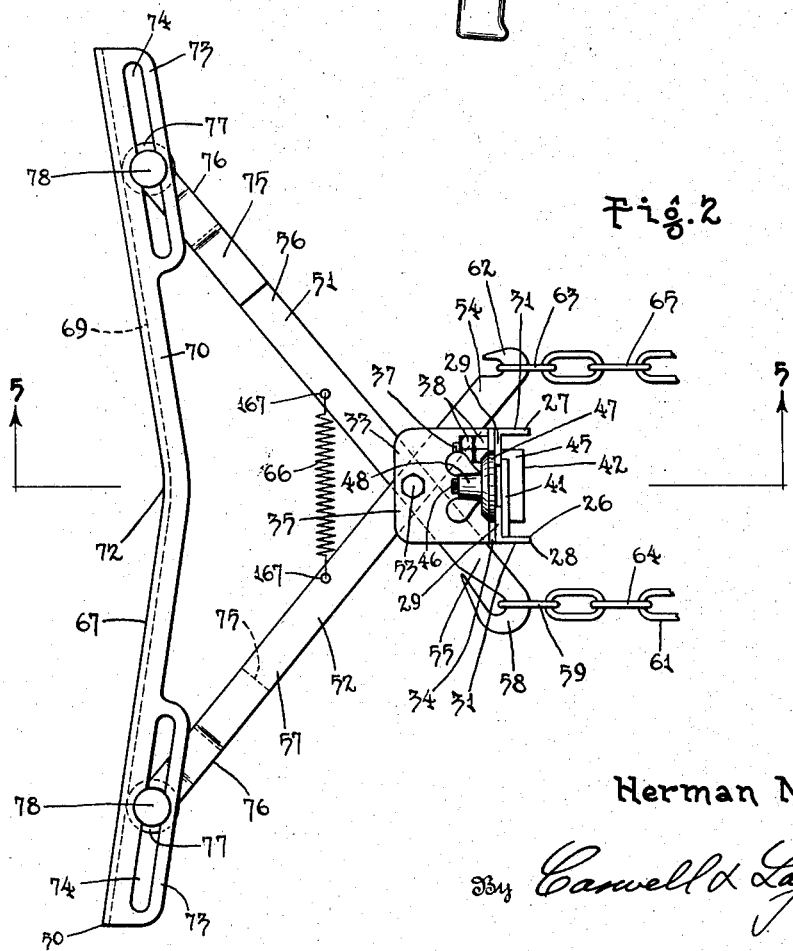

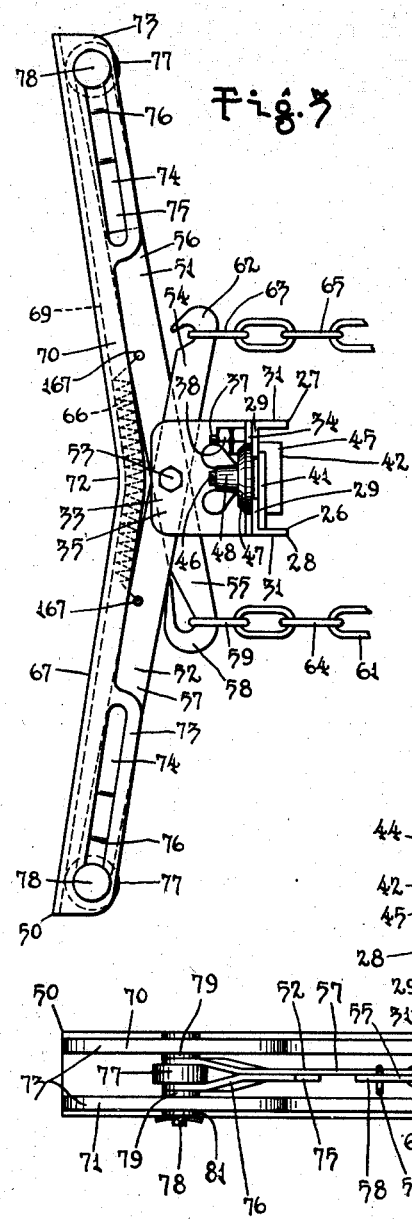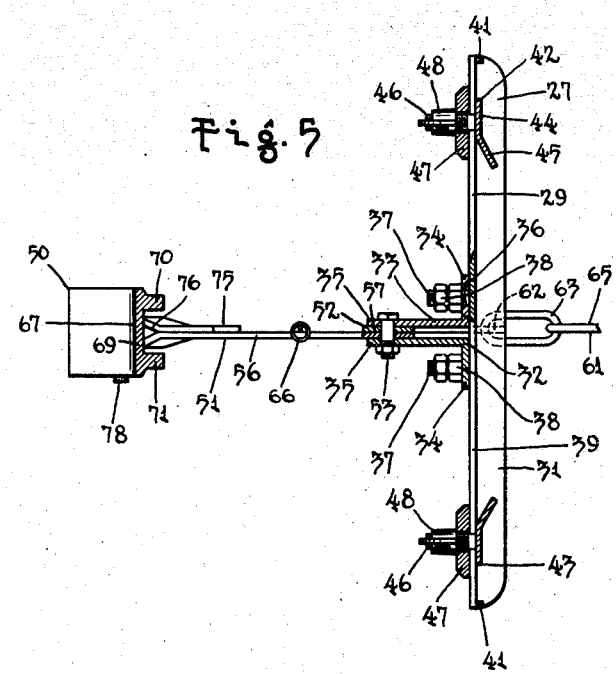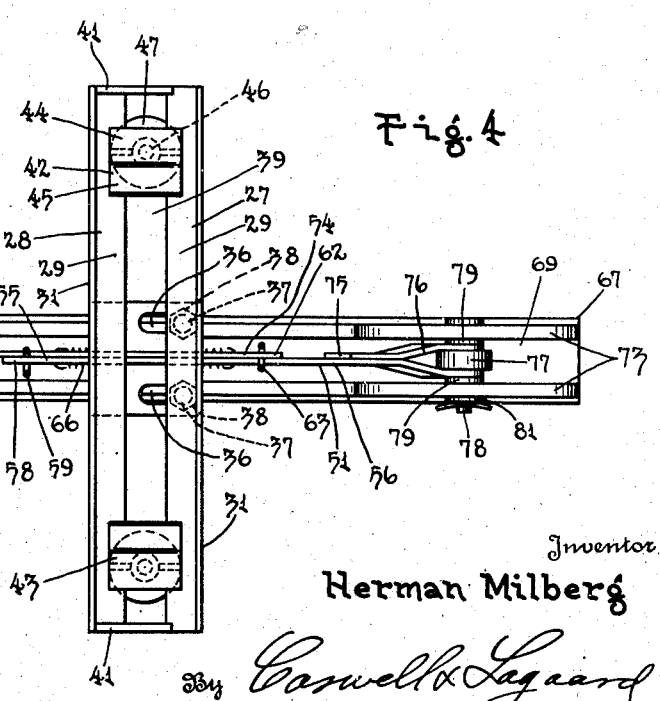

2,298,772

UNITED STATES PATENT OFFICE 2,298,772

FEED DEVICE FOR PORTABLE TOOLS

Herman Milberg, East Union, Minn.

Application June 10, 1940, Serial No. 339,734

11 Claims. (Cl. 77—32)

My invention relates to feed devices for portable tools and has for an object to provide a feed device having an actuator movable in a direction toward the work to procure relative movement of the work and the tool toward each other.

An object of the invention resides in providing a feed device which may be attached to a portable drill and when positioned does not project sufficiently outwardly beyond the drill to inconvenience the operator in use of the drill.

Another object of the invention resides in providing a feed device utilizing two connectors and employing equalizing means for uniformly tensioning both connectors.

An object of the invention resides in providing a feed device adapted to be easily and quickly attached to portable tools such as electric drills and the like.

Another object of the invention resides in providing a support carried by the tool and having pivoted thereto one or more levers movable in a direction to tension the connector or connectors.

A still further object of the invention resides in utilizing two crossed levers pivoted intermediate their ends to the support and in securing the connectors to the ends of the levers nearest the work.

An object of the invention resides in connecting to the other ends of the levers an actuator for moving the levers in a manner to tension the connectors.

A feature of the invention resides in pivoting said levers to said support at such localities as to form short arms and long arms in the lever and in connecting the connectors to the short arms of the levers.

Another feature of the invention resides in providing resilient means acting between the levers and serving to move the same in a direction opposite to that caused by the actuator.

An object of the invention resides in constructing the actuator in the form of a breastplate and in slidably connecting one or both ends of the breastplate to the outermost ends of the levers.

A still further object of the invention resides in forming the breastplate at one end thereof with a slot, and in providing the lever with a member slidable along said slot.

Other objects of the invention reside in the novel combination and arrangement of parts and in the details of construction hereinafter illustrated and/or described.

In the drawings:

Fig. 1 is a side elevational view of an electric drill illustrating an embodiment of my invention applied thereto.

Fig. 2 is a plan view of the feed device removed from the drill.

Fig. 3 is a view similar to Fig. 2 showing the parts in altered position.

Fig. 4 is an end view of the structure shown in Fig. 2.

Fig. 5 is an elevational sectional view taken on line 5—5 of Fig. 2.

In the use of electric drills, particularly for heavy work, it becomes exceedingly difficult to exert sufficient pressure on the breastplate of the drill to procure successful operation of the drill. Feed devices have heretofore been employed utilizing screws and similar expedients. Such feed devices are highly unsuitable and undesirable due to the fact that movement of the actuator is in a lateral direction with respect to the axis of the drill which would tend to throw the drill out of alignment. In addition such devices are extremely slow and clumsy to operate. The present invention overcomes these disadvantages in providing a device which can be rapidly applied to the work and which is actuated by pressure exerted in the same direction as the pressure exerted on the breastplate of the drill.

For the purpose of illustrating my invention I have shown in Fig. 1 an electric drill indicated in its entirety by the reference numeral 10. This drill comprises an electric motor 11 having end bells 12 and 13, and a body portion 14 disposed therebetween. The body 14 has issuing from the lowermost portion thereof a pistol grip handle 15 provided with a trigger 16 for operating the switch for the motor. This body portion also has a steadying handle 17 extending in the opposite direction from the handle 15. The end bell 12 is constructed with a rearwardly extending hand grip 18 which is enlarged at the outermost portion thereof to form a breastplate 19. This breastplate is relatively narrow and is elongated in form, being provided with extensions 21 which project outwardly beyond the hand grip 17. The end bell 13 forms a gear housing for housing a suitable transmission whereby a chuck 22, rotatably mounted in a bearing 23 formed on said end bell, may be driven. A drill 24 is shown as mounted in the chuck 22, which drill is illustrated as engaging the work 25 to be drilled.

The invention proper includes a support 26 which consists of two angle members 27 and 28 which are situated side by side and which have flanges 29 lying in a common plane, and flanges 31 projecting outwardly therefrom. By means of this construction the support becomes channel-shaped in cross section. The angle member 28 has welded to it two angle-shaped brackets 32 and 33 which have flanges 34 resting upon the flange 29 of said angle member and which have flanges 35 projecting outwardly therefrom. The flanges 34 of both of these brackets are welded to the flange 29 of the angle member 28. The two flanges 34 of the brackets 32 and 33 are constructed with transverse slots 36, best shown in Fig. 4, which slots extend across the flange 29 of the angle member 27. This flange has welded to it two studs 37 which project through the slots 36. By means of these studs and slots the angle member 27 is guided for movement toward and from the angle member 28. Nuts 38, screwed upon the studs 37, hold the angle member 27 in adjusted position relative to the angle member 28. As will be seen in Fig. 4 the two flanges 29 of the angle members 27 and 28 are spaced from one another to form a slot 39 therebetween. The flange 29 of the angle member 28 has secured to the ends thereof two fingers 41 which are welded thereto and which overlie the flange 29 of the angle member 27. These fingers close the ends of the slot 39.

The support 26 is attached to the breastplate 19 of the drill 10 by means of two metal clips 42 and 43 which engage the extensions 21 of said breastplate and clamp the same against the flanges 29 of the angle members 27 and 28. Inasmuch as both of these clips and the structure for attaching the same to the support 26 are identical, only the clip 42 and its associated structure will be described in detail.

The clip 42 is constructed from a sheet of metal which is bent to provide an overlying platelike portion 44 adapted to extend across and rest upon the flanges 29 of the angle members 27 and 28. Said clip is further formed with a projecting portion 45 which extends angularly from the portion 44 and which is adapted to overlie the extension 21 of the breastplate 19. The portion 44 has issuing from it a stud 46 which is welded thereto. This stud extends through the slot 39 and through a large washer 47 disposed upon the opposite sides of the flanges 29. A nut 48, preferably a wing nut, is screwed upon the end of the stud 46 and clamps the clip in position with reference to the support 26. It will be noted that the clip 42 is disposed between the flanges 31 of the angle members 27 and 28. By means of the construction described the clip 42 may be adjusted longitudinally of the support 26 from a position adjacent the finger 41 to a position adjacent the bracket 32.

The invention includes two crossed levers 51 and 52 which are disposed between the two flanges 35 of the two brackets 32 and 33. These two levers are constructed of bar material and are pivoted to the brackets 32 and 33 by means of a bolt 53 which extends jointly through said levers and the two flanges 35. By means of this construction the levers are caused to swing in parallel planes and are restrained from lateral movement out of said planes. The holes in the levers 51 and 52 through which the bolt 53 extends are situated intermediate the ends of the levers in such a manner that the levers are formed with short arms 54 and 55 nearest the work and with longer arms 56 and 57 outwardly thereof.

The end of the arm 55 of lever 51 is constructed with an eye 58 in which is received the end link 59 of a chain 61. The corresponding arm 54 of lever 52 is constructed with an open hook 62 over which may be hooked any of the links of the chain 61. The other end link 63 of the said chain has been shown as hooked over the hook 62, in Fig. 2. The chain 61 serves as a connecting means between the work and the feed device, and when wrapped about the work, as illustrated in Fig. 1, the same provides two runs 64 and 65 which serve as connectors between the work and the feed device. Connected to the two arms 56 and 57 of the levers 51 and 52 is a tension coil spring 66, the ends of which are hooked in holes 167 in said arms. This spring tends to move the arms together which has the effect of moving the eye 58 and the hook 62 toward the work. This slackens the levers, permitting of wrapping the chain around the work and hooking the closest link on the hook 62. The movement of the levers 51 and 52 by spring 66 is terminated when the arms 54 and 55 strike the corners of the angle members 27 and 28.

The two levers 51 and 52 are swung about the bolt 53 as a pivot by means of an actuator 67. The actuator 67 is in the form of a breastplate and consists of a channel-shaped plate 67 having a web 69 and flanges 70 and 71 projecting outwardly therefrom. The said breastplate is concave as shown, being bent at the middle, as indicated at 72. The flanges 70 and 71 are enlarged at their ends, as designated at 73, and said enlarged portions have slots 74 formed therein. The arms 56 and 57 of the levers 51 have welded to them strips 75 of metal which forms forks 76 at the ends of said levers. Between these forks are disposed rollers 77 which are rotatably mounted on bolts 78 extending through the slots 74 and through the ends of the forks 76. Suitable washers 79 hold the rollers 72 centrally between the flanges 70 and 71. Other washers 81 on the ends of the bolts 78 serve the same purpose as the heads of the bolts. The rollers 77 are adapted to roll along the inner surface of the web 69 of the breastplate 67.

The operation of the invention is as follows: The support 26 is first applied to the breastplate 19 of the drill by loosening the nuts 38 of studs 37 and sliding the angle member 27 toward the angle member 28 until the flanges 31 of said angle members engage the sides of the breastplate 19. The nuts 38 are then tightened down. The thumb nuts 48 are next loosened and the clips 42 and 43 moved to the ends of the support 26. The breastplate is then properly positioned and the clips moved toward the extensions 21 until the same engage the extensions, as shown in Fig. 1. Upon tightening the nuts 48 the support 26 becomes properly applied to the drill. The chain 61 is next wrapped about the work and the nearest link to the hook 62 is hooked over the same. The operator then grasps the handles 15 and 17 and exerts pressure on the breastplate 67. This may be accomplished by pushing toward the work or by pulling the handles 15 and 17 toward the operator or by a combination of both. As the drill operates the pressure so exerted swings the two levers 51 and 52, moving the breastplate 67 toward the work and drawing the eye 58 and hook 62 in the opposite direction. This procures relative movement of the work and the tool toward each other. It will readily be comprehended that, if the link of the chain should engage a corner of the work so that it would be impossible to center the chain on the work, one run or connector would be longer than the other. Due to the fact that both levers are pivoted on the same pivot 53 and operate independently of the support, the support and drill would remain in proper position and the tensioning mechanism consisting of the levers and breastplate would adjust itself so that equal tension would be had upon both connectors. Thus the operation of the drill would not be affected and the drill could be made to drill properly into the work and along the line desired. This construction functions as an equalizing device on the two connectors.

The advantages of my invention are manifest. The device is extremely simple and practical in construction. When the tensioning device is applied to a drill the same does not project rearwardly of the drill to such an extent that the operator is inconvenienced in using the drill. With my invention the drill can be advanced by pressure through the breastplate and also by pulling on the handles. This permits the operator to drill in localities where it would be impossible to secure sufficient pressure through the footing had by the operator. The device is readily adjustable to fit a large number of different types and sizes of drills. The device being operated through pressure on the breastplate leaves the operator with both hands free to hold and guide the drill. With my invention the movements are similar to those required when operating the drill in the customary manner so that the operator can operate the drill without difficulty. By means of the levers pivoted as arranged, the tension on the two connectors is equalized whereby the chain does not have to be centered with respect to the work.

Changes in the specific form of my invention, as herein disclosed, may be made within the scope of what is claimed without departing from the spirit of my invention.

Having described my invention, what I claim as new and desire to protect by Letters Patent is:

1. A feed device for portable rotary tools comprising a support carried by the tool, a pair of crossed levers pivoted intermediate their ends to said support, substantially in alignment with the axis of the tool, a connector between two of the corresponding ends of the levers and the work, a single actuator connected to the other ends of both of the levers to procure simultaneous movement thereof, said actuator being adapted upon movement toward the work to swing the levers in a direction to procure relative movement of the work and the tool toward each other.

2. A feed device for portable tools comprising a support carried by the tool, a pair of crossed levers pivoted intermediate the ends thereof to the support and nearer one end of each lever than the other to form in each lever a short arm and a long arm, a connector between each of the short arms and the work, and a breastplate extending across the ends of the long arms and connected thereto, said breastplate upon movement toward the work swinging the levers in a direction to procure relative movement of the work and the tool toward each other.

3. A feed device for portable tools comprising a support carried by the tool, a pair of crossed levers pivoted intermediate their ends to the support, connectors connected to the ends of said levers nearest the work and to the work, and a breastplate extending across the other ends of the levers, said breastplate upon movement in a direction toward the work swinging the levers in a direction to procure relative movement of the work and the tool toward each other.

4. A feed device for portable tools comprising a support carried by the tool, a pair of crossed levers pivoted intermediate their ends to the support, connectors connected to the ends of said levers nearest the work and to the work, and a breastplate extending across the other ends of the levers, means for slidably connecting one end of said breastplate to the other end of one of said levers, means for movably connecting the other end of the breastplate to the other end of the other lever, said breastplate upon movement toward the work swinging the levers in a direction to procure relative movement of the work and the tool toward each other.

5. A feed device for portable tools comprising a support carried by the tool, a pair of levers pivoted to the support, connectors between the levers and the work, resilient means acting between both of the levers and free of the support to swing the levers in a direction to loosen the connection between the work and the tool, and an actuator connected to the levers for swinging the same in the opposite direction and in opposition to the resilient means to procure relative movement of the work and the tool toward each other.

6. A feed device for portable tools comprising a support carried by the tool, a pair of crossed levers pivoted intermediate the ends thereof to the support and nearer one end of each lever than the other to form in each lever a short arm and a long arm, a connector between each of the short arms and the work, resilient means acting between the long arms of the levers for causing the levers to swing in a direction to loosen the connection between the work and the tool, and an actuator connected to the long arms of the lever for simultaneously swinging the lever in a direction to procure relative movement of the work and the tool toward each other.

7. In combination with an electric drill having a breastplate formed with free ends, a support comprising two angle members, means for guiding said angle members for transverse movement relative to one another to cause the same to engage the sides of the breastplate of the drill, clips adjustably movable along said angle members for engaging the free ends of the breastplate of the drill, a tensioning device carried by said support, a connector for connecting the work and said tensioning device, and an actuator for operating said tensioning device.

8. In combination with an electric drill having a breastplate formed with free ends, a support channel-shaped in cross section and receiving the breastplate of the drill therebetween, clips carried by said support and engaging the ends of the breastplate, a tensioning device carried by said support, a connector connected to the work and to said tensioning device, and an actuator for operating said tensioning device.

9. A feed device for portable tools comprising a support carried by the tool, a pair of crossed levers pivoted intermediate their ends to said support, connecting means between two of the corresponding ends of the levers and the work, a breastplate extending across the other ends of the levers, said breastplate and one of said levers having juxtaposed parts, a slot formed in one of said juxtaposed parts, a member carried by the other part and slidable in said slot, and means for connecting the other end of the breastplate to the other end of the other lever.

10. A feed device for portable tools comprising a support carried by the tool, a pair of crossed levers pivoted intermediate their ends to said support, connecting means between two of the corresponding ends of the levers and the work, a breastplate extending across the other ends of the levers, said breastplate having a slot at one end thereof, a member carried by the lever associated with said end of the breastplate and slidable along said slot, and means for movably connecting the other end of said breastplate to the other end of the other lever.

11. A feed device for portable tools comprising a support carried by the tools, a pair of levers pivoted to the support, a connector between one end of each of the levers and the work, and means for simultaneously moving both levers to cause simultaneous tension on the connectors.

HERMAN MILBERG.